United States Patent
Oh

(10) Patent No.: US 7,698,581 B2
(45) Date of Patent: Apr. 13, 2010

(54) MANAGING POWER CONSUMPTION OF A GRAPHIC APPARATUS

(75) Inventor: Jang Geun Oh, Youngdungpo-gu (KR)

(73) Assignee: LG Electronics Inc., Seoul (KR)

(*) Notice: Subject to any disclaimer, the term of this patent is extended or adjusted under 35 U.S.C. 154(b) by 688 days.

(21) Appl. No.: 11/531,236

(22) Filed: Sep. 12, 2006

(65) Prior Publication Data

US 2007/0103836 A1  May 10, 2007

(30) Foreign Application Priority Data

Oct. 14, 2005  (KR) .................. 10-2005-0097188

(51) Int. Cl.
  G06F 1/00  (2006.01)
  G06F 1/26  (2006.01)
  G06F 1/32  (2006.01)
  G06F 13/40  (2006.01)
(52) U.S. Cl. .................. 713/300; 713/320; 713/324; 710/307
(58) Field of Classification Search .................. 713/300, 713/320, 324; 710/307
  See application file for complete search history.

(56) References Cited

U.S. PATENT DOCUMENTS 6,356,106 B1 * 3/2002 Greeff et al. .................. 326/30
6,894,691 B2 * 5/2005 Juenger ...................... 345/531

* cited by examiner

Primary Examiner—Mark Connolly
(74) Attorney, Agent, or Firm—Fish & Richardson P.C.

(57) ABSTRACT

A power management system includes a graphic controller configured to generate a first display information signal and a second display information signal. The system includes a memory device operatively connected with the graphic controller and a parallel terminal unit. The memory device and the parallel terminal unit are configured to collectively support the graphic controller to generate the first display information signal at a first clock speed and at a first power consumption level. The memory device is configured to support the graphic controller without the parallel terminal unit to generate the second display information signal at a second clock speed and at a second power consumption level. The system includes a hybrid cycling controller configured to alternately connect the parallel terminal unit with the memory device for the first display information signal and to disconnect the parallel terminal unit from the memory device for the second display information signal during a predetermined period, and a power consumption controller configured to control the hybrid cycling controller according to a ratio between a connection interval and a disconnection interval of the parallel terminal unit with the memory device.

23 Claims, 6 Drawing Sheets

FIG. 3

| AC power | battery level | application load | power management mode |
|---|---|---|---|
| AC power connection | – (1st power mode group) | large | MPM |
| | | intermediate | HCM1 |
| | | small | HCM2 |
| AC power disconnection | large (2nd power mode group) | large | HCM2 |
| | | intermediate | HCM3 |
| | | small | BOM |
| | intermediate (3rd power mode group) | large | HCM3 |
| | | intermediate | HCM4 |
| | | small | BOM |
| | small (4th power mode group) | large | HCM4 |
| | | intermediate | BOM |
| | | small | BOM |

MPM : maximum power performance mode
HCM : hybrid cycling mode
BOM : battery optimization mode

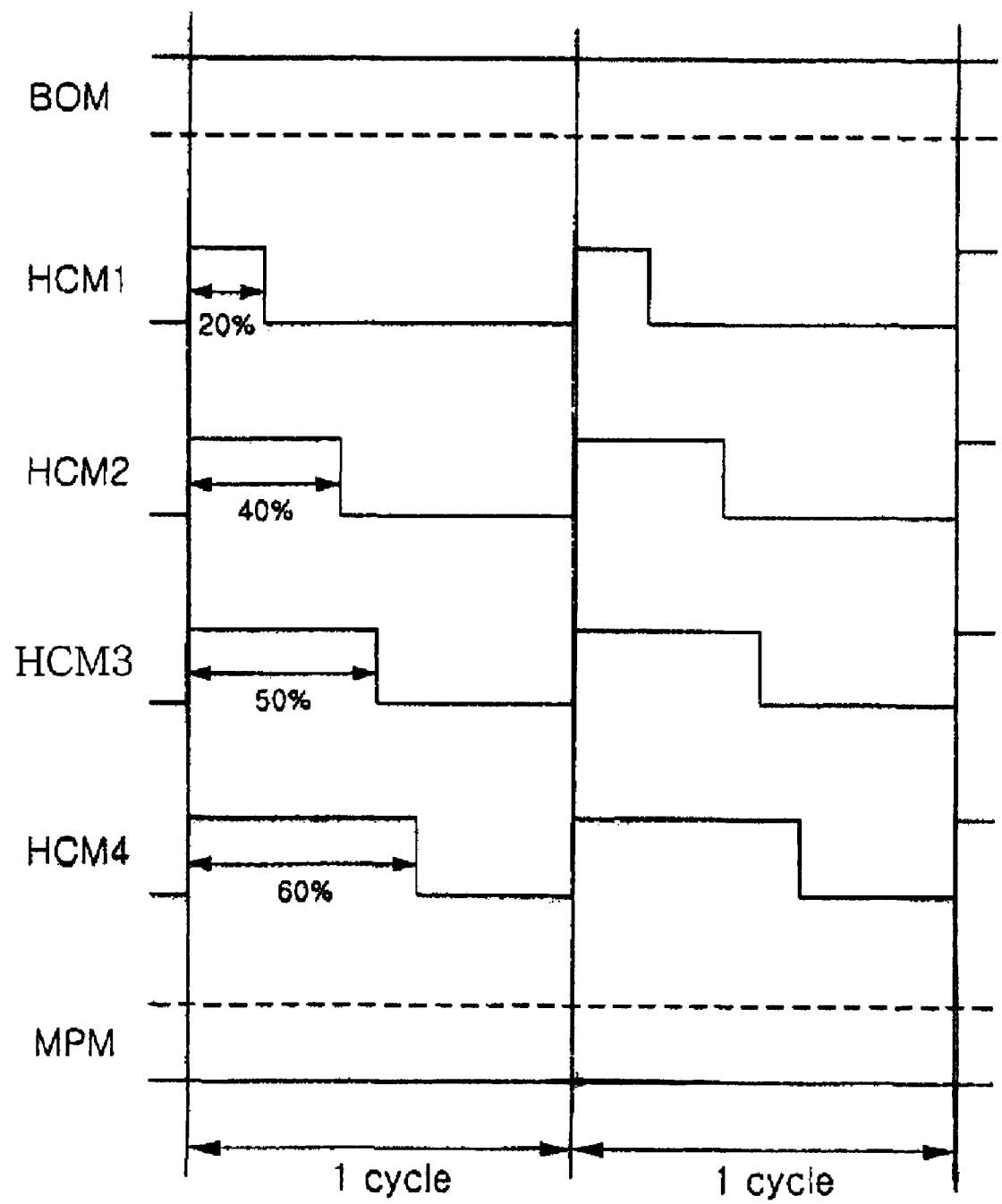

MANAGING POWER CONSUMPTION OF A GRAPHIC APPARATUS

BACKGROUND

This description relates to managing the power consumption of a graphic apparatus for a computer.

An information handling system processes, compiles, stores and communicates information or data for public and private use. For example, information handling systems may be used for bank account transfers, airplane ticket reservations, large volume data storage, wide area communication, or other applications involving large quantities of data. An information handling system includes various hardware or software elements for processing, storing, and communicating information, and includes at least one computer system, at least one data storage system, and at least one communication network system.

Recent developments in memory device technology have improved the capabilities of data storage and data transmission of information handling systems. For example, a Double Data Rate (DDR) memory device transmits data at both edges (i.e., data is transferred at both the rising and falling edges of the clock signal), which effectively doubles the data transmission rate and thereby increases the quantity of data output on a memory bus. Faster data transmission by the DDR memory induces faster use of the data by processors and other devices, thereby rapidly increasing the overall operation speed. However, the faster data transmission by the DDR memory may also increase bus noise, which may reduce the quality of data signals, such as by having transmission reflection increase inter-signal interference. In order to compensate for the increased signal interference, the DDR memory employs a parallel transmission scheme for high-speed data transmission. The parallel transmission scheme decreases the potential degradation of the data signal by eliminating the transmission reflection. However, the parallel transmission scheme may also increase the power consumption.

One difficulty in the use of the DDR memory is found in an information handling system that operates by using an internal power source. For example, if the internal battery power of a portable computer is limited or exhausted, the portable computer may operate by using an external power source which can recharge the battery and power the system. If a portable computer has a DDR memory using a parallel transmission scheme, the use of a parallel transmission scheme consumes an increased quantity of power, which may shorten the period during which the internal power source or battery can supply power for computer operation. However, in a portable computer having a DDR memory which does not use a parallel transmission scheme, the additional expense of a DDR memory may not be justified since the DDR memory generally does not transmit data at a high clock speed.

Even when the information handling system operates using an external power source, the DDR memory may operate at a high speed, regardless of the quantity of the load which may be generated by applications operated in the information handling system, thereby consuming an increased quantity of power.

SUMMARY

In one general aspect, a system for managing power consumption of a graphic apparatus dynamically switches between parallel transmission and serial transmission to properly control power consumption according to the performance of a system.

In another general aspect, managing power consumption in a portable computer having a graphic apparatus with a DDR memory includes dynamically switching between parallel transmission and serial transmission.

In another general aspect, a power management system includes a graphic controller configured to generate a first display information signal and a second display information signal. The system also includes a memory device operatively connected with the graphic controller and a parallel terminal unit. The memory device and the parallel terminal unit are configured to collectively support the graphic controller to generate the first display information signal at a first clock speed and at a first power consumption level. The memory device also is configured to support the graphic controller without the parallel terminal unit, in which case the second display information signal is generated at a second clock speed and at a second power consumption level. The system also includes a hybrid cycling controller configured to alternately connect the parallel terminal unit with the memory device for use of the first display information signal and to disconnect the parallel terminal unit from the memory device for use of the second display information signal during a predetermined period. The system further includes a power consumption controller configured to control the hybrid cycling controller according to a ratio between a connection interval and a disconnection interval of the parallel terminal unit with the memory device. The ratio is set based on a characteristic of a power source operatively connected to the system.

Implementations may include one or more of the following features. For example, the characteristic of the power source may include an amount of available battery power, the operative connection to an internal battery, and/or the operative connection to an external power source. The power source may be a battery and/or an external power source.

The power consumption controller may be configured to control the hybrid cycling controller based on a first ratio of the connection interval to the disconnection interval with respect to the parallel terminal unit if the power source is a battery, and based on a second ratio of the connection interval to the disconnection interval with respect to the parallel terminal unit if the power source is an external power source. The first ratio may be smaller than the second ratio, and the connection interval to the parallel terminal unit may be smaller when the power source is the battery than when the power source is the external power source.

The first and second display information signals may be based on the operation of at least one application program.

The power consumption controller may be configured to control the hybrid cycling controller according to an operation mode set by a user. The operation mode controls the connection interval to the parallel terminal unit.

The power consumption controller may be configured to control the hybrid cycling controller according to an operation mode automatically set by the power consumption controller. The operation mode may control the connection interval to the parallel terminal unit.

In another general aspect, managing consumption of system power includes determining if system power is supplied from an internal power source or an external power source. If the system power is supplied from the internal power source, an amount of available power of the internal power source is detected. A parallel unit is alternately connected and disconnected with a memory for graphic control based on a ratio between a connection interval and a disconnection interval of the parallel terminal unit with the memory. The ratio defines the connection interval with the memory and the disconnection interval for a given time interval.

Implementations may include one or more of the following features. For example, the ratio may be smaller if the power supply is from the internal power source than if the power supply is from the external power source. The ratio also may decrease in proportion to an amount of available power supply from the internal power source.

If the ratio is determined to have been set by a user, the parallel terminal unit is alternately connected and disconnected to and from the memory for graphic control based on the ratio set by the user.

In another general aspect, managing system power consumption includes determining if system power is supplied from an internal power source or an external power source. An amount of available power of the internal power source is detected if the power supply is supplied from the internal power source. A parallel terminal unit is alternately connected and disconnected with a memory for graphic control based on a ratio between a connection interval and a disconnection interval of the parallel terminal unit with the memory. The ratio defines the connection interval with the memory and the disconnection interval for a given time interval. An amount of load from any operating application program is detected and the connecting and disconnecting of the parallel terminal unit with the graphic control is controlled based on the amount of load and the ratio between the connection interval and the disconnection interval.

Implementations may include one or more of the following features. For example, if a user is determined to have set the ratio between the connection interval and the disconnection interval, the parallel terminal unit may be alternately connected and disconnected with the memory for graphic control based only on the ratio set by the user.

In another general aspect, a system for managing power consumption includes a central processing unit configured to operate one or more applications. The system includes a memory operatively connected with the central processing unit and configured to communicate data at a high clock speed and a low clock speed. The system includes a parallel terminal unit operatively connected with the memory, and a switch configured to connect and disconnect the parallel terminal unit to and from the memory. The system also includes a hybrid cycling controller configured to periodically control the switch to connect or disconnect the parallel terminal unit to and from the memory, an internal power source for supplying system power, and an external power adaptor for supplying system power. The system also includes a power consumption controller configured to control the hybrid cycling controller according to a ratio between a connection interval and a disconnection interval of the parallel terminal unit with the memory. The ratio is set based on a whether the power source operatively connected to the system is the external AC adaptor or the internal power source.

Implementations may include one or more of the following features. For example, the internal power source may be a battery, and the ratio may be based on an amount of available battery power.

The power consumption controller may be configured to control the hybrid cycling controller based on a first ratio of the connection interval to the disconnection interval with respect to the parallel terminal unit if the power source is a battery. The power consumption controller may be configured to control the hybrid cycling controller based on a second ratio of the connection interval to the disconnection interval with respect to the parallel terminal unit if the power source is an external power source. The first ratio may be smaller than the second ratio, and the connection interval to the parallel terminal unit may be smaller when the power source is the battery than when the power source is supplied from the external power source.

Other features will be apparent from the following description, including the drawings, and the claims.

BRIEF DESCRIPTION OF THE DRAWINGS

FIG. 3 is a power management table used for determining a power management mode.

FIG. 4 is a graphical view of waveforms of a speed switching signal output to the hybrid cycling controller of FIG. 2.

DETAILED DESCRIPTION

Figure 1:
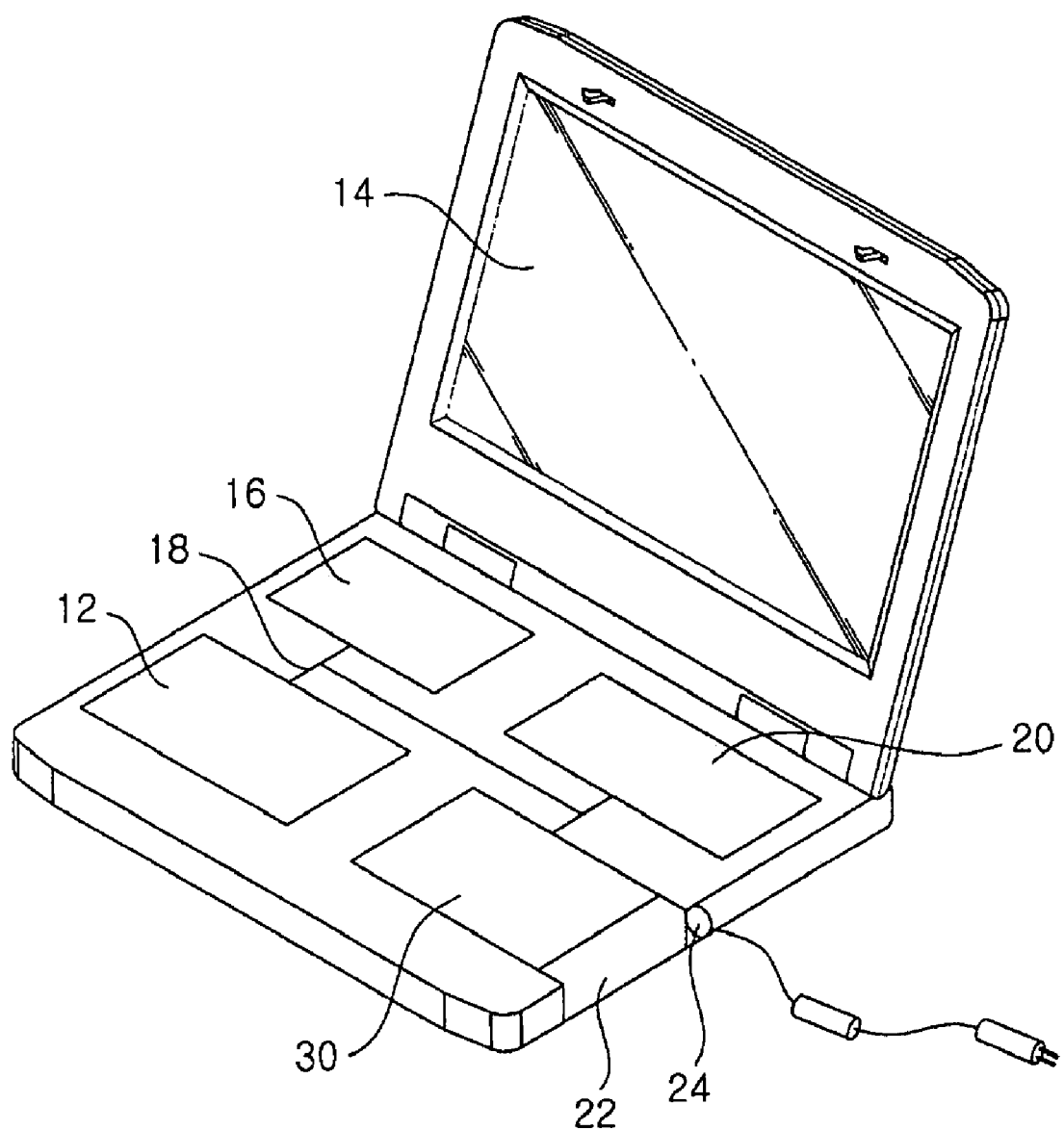
FIG. 1 is a perspective view of a portable computer having a graphic apparatus with a power consumption control system.

A DDR memory is a memory device that generally provides high speed data transmission. However, if the DDR memory operates at a high clock speed for high speed data transmission, a parallel terminal unit is used to reduce transmission reflection. The parallel terminal unit may increase power consumption. In an information handling system, such as a portable computer, that depends on an internal power source of limited duration and capacity, the DDR memory reduces the operation time of the portable computer when the DDR memory operates at a high clock speed. In order to control the power consumption of the information handling system, the system may be configured to select an operation speed for the DDR memory from between a high speed operation that consumes a large quantity of power and uses the parallel terminal unit, and a relatively low speed operation that consumes a reduced quantity of power and avoids use of the parallel terminal unit.

In the case of low speed operation of the DDR memory, which does not use the parallel terminal unit, data is transmitted in series. For the purpose of such applications, the information handling system may include any computing device or collective system of computing devices for the operation, classification, processing, transmission, reception, searching, generation, switching, storage, display, handling, detection, recording, reproduction, treatment, and/or use of any information, knowledge, or data. For example, the information handling system may be either a personal computer, a storage device in a communication network, or any other similar computing apparatus.

An exemplary information handling system may include a random access memory, at least one processing resource, such as a central processing unit or a hardware or software control logic, a Read Only Memory (ROM), and/or another type of non-volatile memory. Additional elements of the information handling system may include various input and output devices, such as a disk drive or drives, at least one communication port for communication with an external device, a keyboard, a mouse, and a video display. The information handling system may include at least one bus operated for transmission between various hardware elements.

A high speed mode, a low speed mode, or a hybrid cycling mode is selected for an operation of a DDR graphic memory to control power consumption of a portable computer which operates load-intensive applications or which operates off of battery power. In the hybrid cycling mode, the high speed operation and the low speed operation of the graphic DDR memory are repeated according to a predetermined duty rate. The hybrid cycling mode can be divided into first through fourth hybrid cycling modes based on the duty rate between the high speed operation and the low speed operation.

For example, in the first hybrid cycling mode, a ratio between the high speed interval and the low speed interval of a DDR memory operation in one cycle time period may be set as 8:2, so that a graphic having the second highest resolution can be displayed. In the second hybrid cycling mode, the ratio between the high speed interval and the low speed interval of a DDR memory operation in one cycle time period may be set as 6:4, so that a graphic having the third highest resolution can be displayed. In the third hybrid cycling mode, the ratio between the high speed interval and the low speed interval of a DDR memory operation in one cycle time period may be set as 5:5, so that a graphic having the third lowest resolution can be displayed. In the fourth hybrid cycling mode, the ratio between the high speed interval and the low speed interval of a DDR memory operation in one cycle time period may be set as 4:6, so that a graphic having the second lowest resolution can be displayed.

Referring to FIG. 1, a portable computer 10 includes a central processing unit (CPU) 12 operating a software application generating information to be displayed on a liquid crystal display (LCD) panel 14. The information to be displayed is transmitted from the CPU 12 through a bus 18 to a graphic controller 16. The graphic controller 16 displays the information on the LCD 14 by generating display signals. A graphic memory 20 in the form of a DDR memory is connected to the graphic controller 16 through the bus 18.

The DDR memory 20 stores information to be used by the graphic controller 16 to assist in the generation of the display signals. Further, the DDR memory 20 stores the display signals generated by the graphic controller 16, and transfers the stored display signals to the LCD 14.

The portable computer operates by using either internal power from an internal power source, such as a battery, or an external power source supplied through an external power adaptor. The external power is supplied through external direct current which is converted by an AC/DC converter from alternating current supplied through an electric outlet and is then supplied through an electric wire in an adaptor. An internal power source 22 is recharged by the power supplied through an external power adaptor 24 after the internal power source 22 supplies power for a limited duration. A basic input and output system (BIOS) 30 manages hardware devices of the portable computer 10.

Figure 2:
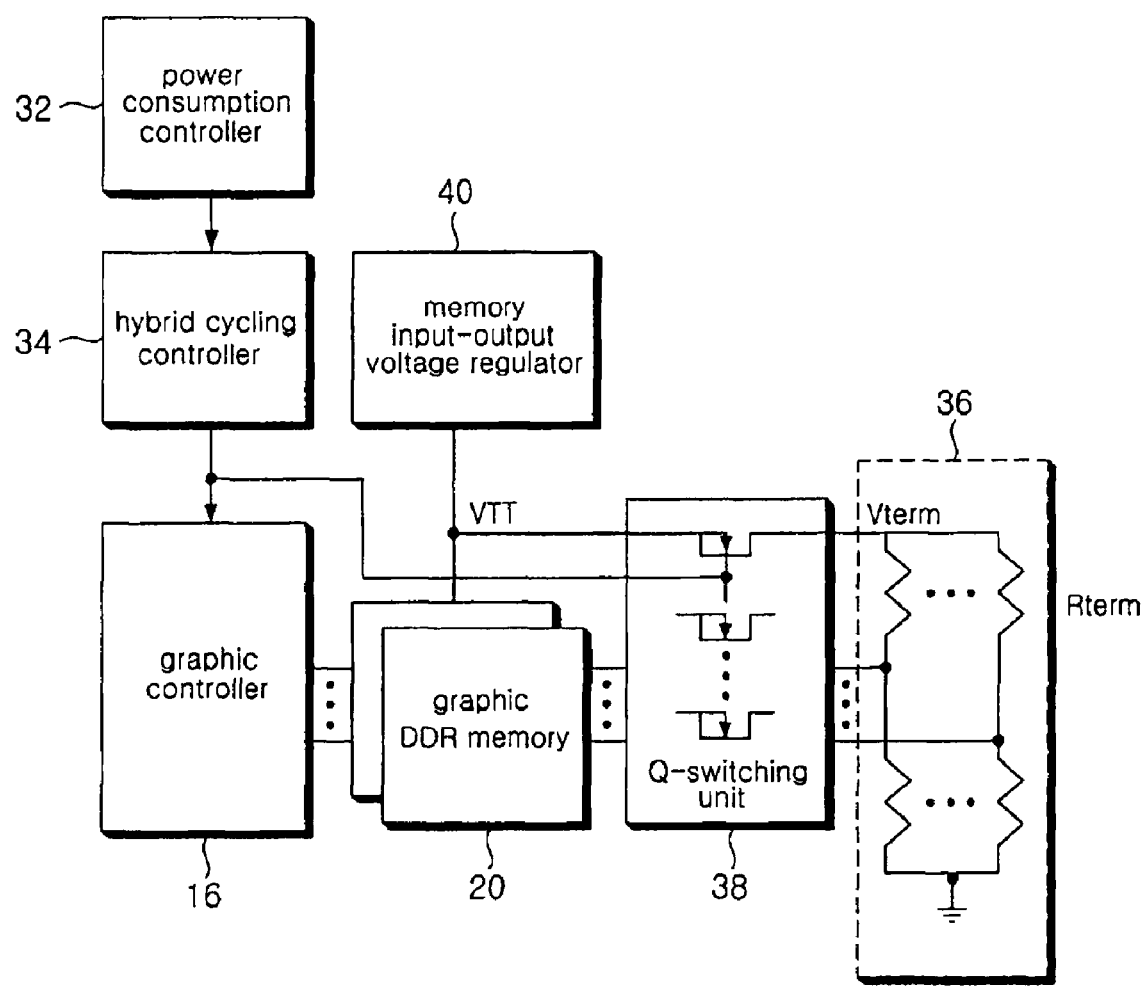
FIG. 2 is a block diagram of a system for power management using dynamic selection of an operation speed of a graphic DDR memory.

Referring also to FIG. 2, the DDR memory 20 operates at either a high clock speed, a low clock speed, or a hybrid cycling speed at which the high clock speed and the low clock speed periodically alternate, thereby controlling the power consumption of the portable computer. In the high clock speed operation, the DDR memory 20 is connected with a parallel terminal unit 36 so as to achieve efficient data transmission without excessive interference due to transmission reflection. In the low clock speed operation, the DDR memory 20 is separated from the parallel terminal unit 36, which reduces power consumption. The low clock speed operation does not require the parallel terminal unit 36, because there is no transmission reflection interference when operating at a low clock speed. Data transmission at the hybrid cycling speed consumes less power than is consumed in the high speed data transmission (e.g., by a proportional amount corresponding to the time interval for the data transmission at the low clock speed).

Selection between the high clock speed, the low clock speed, and the hybrid cycling speed for the operation of the DDR memory 20 is based to some degree on the available power source, such as the battery level or the remaining amount of battery power in the case of an internal power source, and the software applications operated in the portable computer. For example, if the portable computer 10 operates using the internal power source, the hybrid cycling operation or low speed DDR operation is selected, so that the parallel terminal unit 36 and the DDR memory 20 are periodically or continuously disconnected from each other, thereby reducing the power consumption. If the portable computer 10 operates using the external power source, such as through the AC adaptor 24, the high speed or hybrid cycling operation is selected, so that the parallel terminal unit 36 and the DDR memory 20 are continuously or periodically connected, thereby providing high resolution graphics. However, if a user requires the operation of the high speed operation, for example, by selecting a relatively high load application despite having limited battery power, the DDR memory 20 and the parallel terminal unit 36 may be operated when using the internal power source. Although the duration of the available power supply will decrease, the user is provided with the ability to select a high load and high power consumption mode of operation if desired.

FIG. 2 shows a system for power management of an information handling system that provides dynamic selection of an operation speed of a graphic DDR memory. A power consumption controller 32 determines if the graphic DDR memory 20 requires a high speed, a low speed, or a hybrid cycling operation, e.g., a first through fourth hybrid cycling operation, and uses the determined operation speed to control a hybrid cycling controller 34. The power consumption controller 32 is a software module operated by the BIOS 30 or the graphic controller 16, and detects the type of power source used in the portable computer 10, the available battery or external power supply, and the load attributed to applications running on the computer. For example, the power consumption controller 32 may respond to changes in applications operated by the portable computer 10, to changes in the type or quantity of the power source of the portable computer 10, and to changes in the communication state by the operating system operated by the CPU 12 of the portable computer 10.

The power consumption controller 32 determines the power source used by the portable computer 10 and the state of the power source either by directly referring to the BIOS 30 or by referring to the operating system operated by the CPU 12. Based on the determined power source and the state of the power source, the power consumption controller 32 selects one of the operation mode groups from the low speed, high speed, and the first through fourth hybrid cycling operation modes of the DDR memory 20. Alternatively, the power consumption controller 32 selects one resolution group (which corresponds to an operation mode) from among the resolution groups of the first through fourth graphic resolutions that can be displayed according to the available power source for the portable computer. The power consumption controller 32 determines one of the operation mode groups (i.e., resolution groups of displayable graphics) of the graphic DDR memory according to whether the portable computer operates by using the external power source or the internal power source. In addition, the power consumption controller 32 determines if the internal power source (i.e., battery) has a large, intermediate, or small quantity of remaining power (i.e., battery level).

For example, when the portable computer operates by using the external power source, the power consumption controller 32 may control the DDR memory 20 to operate in one of the high speed mode and the first and second hybrid cycling modes. The high speed mode and the first and second hybrid cycling modes may be included in a first operation mode group, since these modes support displaying a graphic having one of the highest resolutions (e.g., the first through the third highest resolutions). If the portable computer operates using an internal power source having a relatively large amount of remaining power (e.g., more than 70% battery level), the power consumption controller 32 may control the DDR memory 20 to operate in one of the second and third hybrid cycling modes and the low speed mode. The second and third hybrid cycling mode and the low speed mode are included in a second operation mode group, since these modes support displaying a graphic having either the third highest through the lowest resolutions. If the portable computer operates by using an internal power source having an intermediate amount of power (e.g., between 70% and 40% remaining battery level), the power consumption controller 32 may control the DDR memory 20 to operate in one of the third hybrid cycling mode, the fourth hybrid cycling mode and the low speed mode. The third and fourth hybrid cycling modes and the low speed mode are included in a third operation mode group, since these modes support displaying a graphic having the third lowest through the lowest resolutions.

If the portable computer operates using an internal power source having a relatively small amount of remaining power (e.g., less than 40% remaining battery level), the power consumption controller 32 may control the DDR memory 20 to operate in one of the fourth hybrid cycling mode and the low speed mode. The fourth hybrid cycling mode and the low speed mode are included in a fourth operation mode group, since these modes support displaying a graphic having either the second lowest or the lowest resolutions.

Referring to FIG. 3, an exemplary power management table represents the logic used by the power consumption controller 32 to set the operation modes. The upper limit of the high speed operation in the battery optimization mode becomes relatively smaller than the upper limit when an external power source, such as an AC power connection, is used. The internal power consumption is generally reduced, and the battery life is prolonged.

The power consumption controller 32 determines the application load by determining the kind and quantity of information generated by the applications operated by the CPU 12. For example, the operating system operated by the CPU 12 includes a list of applications. If an application in the list starts or stops processing information, the application activity is reported to the power consumption controller 32. Based on whether the quantity of the application load in the operating system is large, small, or intermediate, the power consumption controller 32 selects one of the operation modes included in the operation mode group. If the portable computer 10 operates using external power and has a large quantity of application load, the power consumption controller 32 may control the DDR memory 20 to operate in the high speed mode (MPM) selected from the high speed mode (MPM) and the first and second hybrid cycling modes (HCM1 and HCM2) included in the first operation mode group. The selection of the high speed mode (MPM) supports displaying a graphic having the highest resolution.

Accordingly, if the portable computer operates using an internal battery, one of the operation modes included in the second through fourth operation mode groups is selected according to the amount of the remaining internal power and the quantity of the application load. A graphic having a resolution corresponding to the selected operation mode is then displayed. As noted from the power management table shown in FIG. 3, the DDR memory 20 reduces power consumption and extends the operating life and power level of an internal power source such as a battery.

Further, the power consumption controller 32 may selectively employ the high speed mode, the first through fourth hybrid cycling mode, or the low speed mode, in response to a request from a user. The power consumption controller 32 can select a graphic having an intermediate resolution, so as to reduce power in proportion to the data transmission of the graphic DDR memory.

The hybrid cycling controller 34 is a software module operated by the graphic controller 16. In response to commands from the power consumption controller 32, the hybrid cycling controller 34 controls switching between the high speed operation and the low speed operation of the DDR memory 20, so that the DDR memory 20 can selectively perform the high speed operation, the low speed operation, or the first through fourth hybrid cycling operations. The hybrid cycling controller 34 generates a speed switching signal, and the high speed operation and the low speed operation of the DDR memory 20 are determined according to the logic value of the speed switching signal (SSS). For example, when the speed switching signal has a high logic value, the low speed operation is used for the DDR memory 20.

Referring to FIG. 4, when the speed switching signal has a low logic value, the high speed operation is used for the DDR memory 20. If the operation speed command applied from the power consumption controller 32 to the hybrid cycling controller 34 selects the high speed mode, the speed switching signal continuously maintains the low logic value as shown by the waveform MPM. In contrast, if the operation speed command is the low speed mode, the speed switching signal continuously maintains the high logic value as shown by the waveform BOM. Further, when the operation speed command appoints one of the first through fourth hybrid cycling modes, the speed switching signal has one of the waveforms HCM1, HCM2, HCM3, and HCM4, shown in FIG. 4. The waveforms HCM1, HCM2, HCM3 and HCM4 have ratios of 8:2, 6:4, 5:5, and 4:6, respectively, between the high speed interval and the low speed interval in one cycle time period. The time period of the speed switching signal may be set at various periods, for example, 0.5 seconds or one second. If the logic state of the speed switching signal changes from high to low, or from low to high, the DDR memory 20 may operate in one of the first through fourth hybrid cycling modes, the high speed mode, or the low speed mode.

In response to the speed switching signal from the hybrid cycling controller 34, the graphic controller 16 transmits graphic data through a graphic memory bus to the DDR memory 20 at a high or low clock speed. If the speed switching signal has a high logic value, the graphic controller 16 transmits the graphic data to the DDR memory 20 at a low clock speed. In contrast, when the speed switching signal has a low logic value, the graphic controller 16 transmits the graphic data to the DDR memory 20 at a high clock speed.

A Q-switching unit 38 selectively connects the parallel terminal unit 36 with the DDR memory 20 in response to the speed switching signal from the hybrid cycling controller 34 and in a manner similar to the graphic controller 16. If the speed switching signal has a high logic value (i.e., when the graphic controller 16 and the DDR memory 20 operate at a low clock speed), the Q-switching unit 38 is opened to disconnect the parallel terminal unit 36 from the DDR memory 20. The disconnection of the parallel terminal unit 36 reduces the power consumption without influencing the data transmission at the low clock speed. In contrast, when the speed switching signal has a low logic value (i.e., when the graphic controller 16 and the DDR memory 20 operate at a high clock speed), the Q-switching unit 38 is closed to connect the parallel terminal unit 36 with the DDR memory 20, thereby reducing the transmission reflection. As a result, it is possible to achieve high clock speed data transmission by the graphic controller 16 and the DDR memory 20.

A memory input and output voltage regulator 40 supplies a reference voltage to the DDR memory 20 and to the parallel terminal unit 36. The parallel terminal unit 36 receives the reference voltage from the memory input and output voltage regulator 40 at the time of high speed data transmission (i.e., when the Q-switching unit 38 is closed).

Figure 5A:
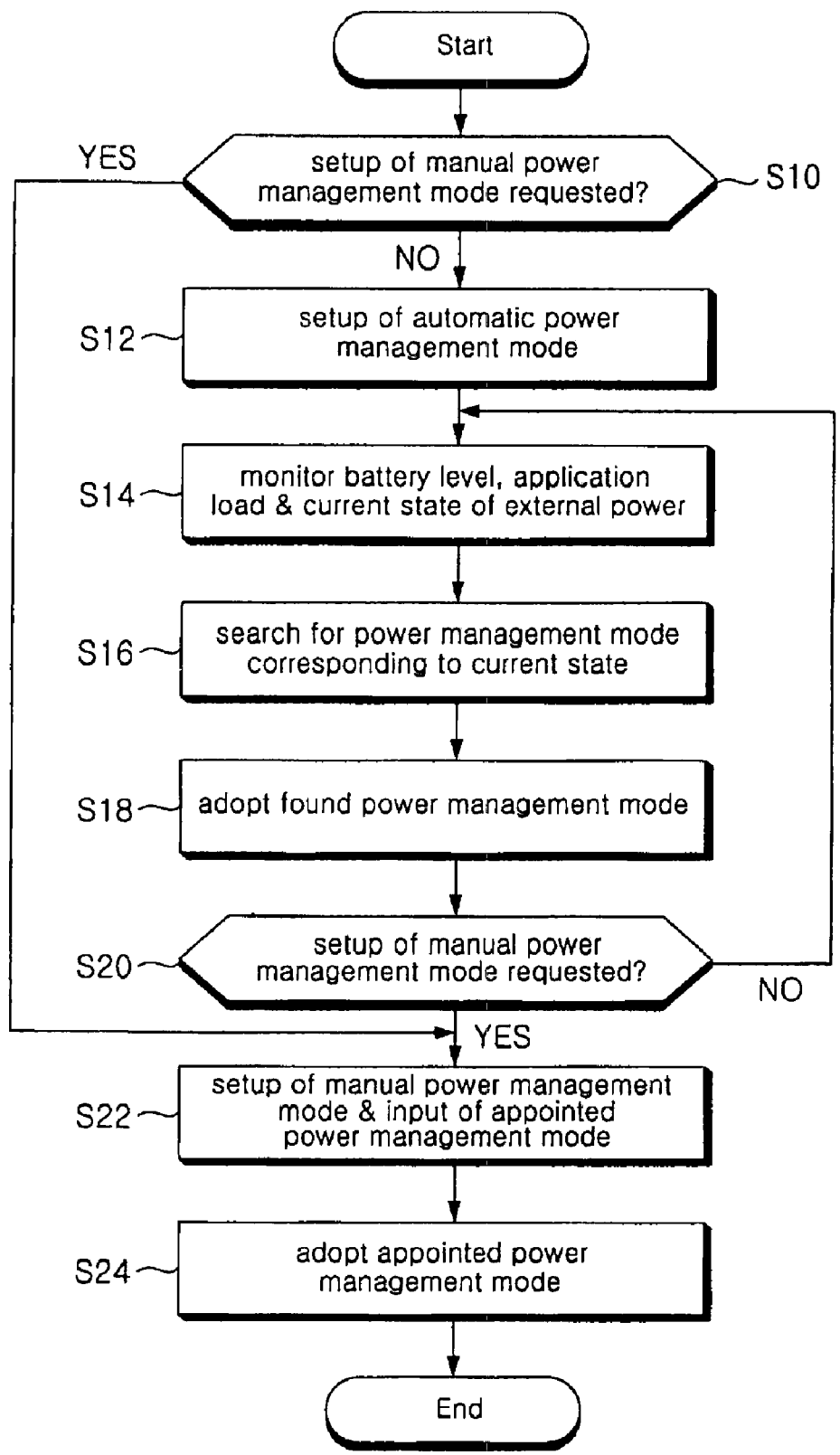
FIG. 5A is a flowchart of a power management process.

Referring to FIG. 5A, the power consumption controller 32 determines if the DDR memory 20 should be connected to the parallel terminal unit 36. The process is initiated by a signal applied to a periodic timer or the power consumption controller 32. The applied signal contains information about a change in the state of the portable computer 10, e.g., a change in the applications operated by the CPU 12, a power source detected by the BIOS 30, and/or a change in the state of the power source.

Initially, the power consumption controller 32 checks if a request for setup of a manual power management mode has been input to the portable computer 10 by a user (S10). When there is no input of a request for setup of a manual power management mode from a user, the power consumption controller 32 resets a manual and automatic power management flag allocated a register included in the CPU 12 or the graphic controller 16. Resetting the manual and automatic power management flag sets up an automatic power management mode (S12). The power consumption controller 32 determines if the portable computer 10 operates by using an internal power source or an external power source, the battery level if operating on an internal power source, and any application load supported by the CPU 12 of the portable computer 10 (S14). The power consumption controller 32 searches an operation mode table, such as the table shown in FIG. 3, for an operation mode of the DDR memory 20 corresponding to the application load and the battery level (S16). A mode from among the high speed mode, the low speed mode, and the first through fourth hybrid cycling modes is selected as the operation mode of the DDR memory 20. The power consumption controller 32 then issues a speed appointment command to the hybrid cycling controller 34 which applies the determined operation mode of the DDR memory 20 to set up the power management mode of the DDR memory 20 (S18). The power consumption controller 32 determines if a user has entered a request for setup of a manual power management mode (S20). If there is no input by the user for a request for setup of a manual power management mode in step S20, the power consumption controller 32 proceeds back to step S14.

Therefore, until a request for setup of a manual power management mode is input to the portable computer 10 from a user, the power consumption controller 32 repeatedly performs steps S14 through S20 so as to manage the power consumption by switching the operation speed mode (i.e., the graphic resolution) of the DDR memory 20 in response to the change in the power, remaining battery level, and application loads. Therefore, the power consumption controller 32 can extend the battery life and operating time, and/or can reduce the power consumption, when the portable computer 10 operates using an external power source. If a user inputs a request for setup of a manual power management mode in step S10 or S20, the power consumption controller 32 sets up the automatic power management mode by setting the manual/automatic power management flag as "1", and inputs the power management mode (i.e., one of the graphic resolutions appointed by the user) (S22). The power consumption controller 32 next sets up an appointed manual power management mode by issuing to the hybrid cycling controller 34 an operation speed command which appoints an operation speed mode (i.e., one of the high speed mode, the low speed mode, and the first through fourth hybrid cycling modes of the DDR memory 20 corresponding to the power management mode appointed by the user) (S24).

If the manual power management mode has been set up, the DDR memory 20 operates in an operation speed mode that consumes more power than the low speed mode, and the user can still obtain a graphic having a desired resolution. If the portable computer 10 operates using a battery power source, the discharge time of the internal power source decreases. In contrast, if the portable computer 10 operates using an external power source, the quantity of the external power consumption increases. However, it is possible to reduce the gradient of the decrease in the operating time of the battery, since it is possible to set up the first through fourth hybrid cycling modes which consume relatively less power than the high speed mode.

Figure 5B:
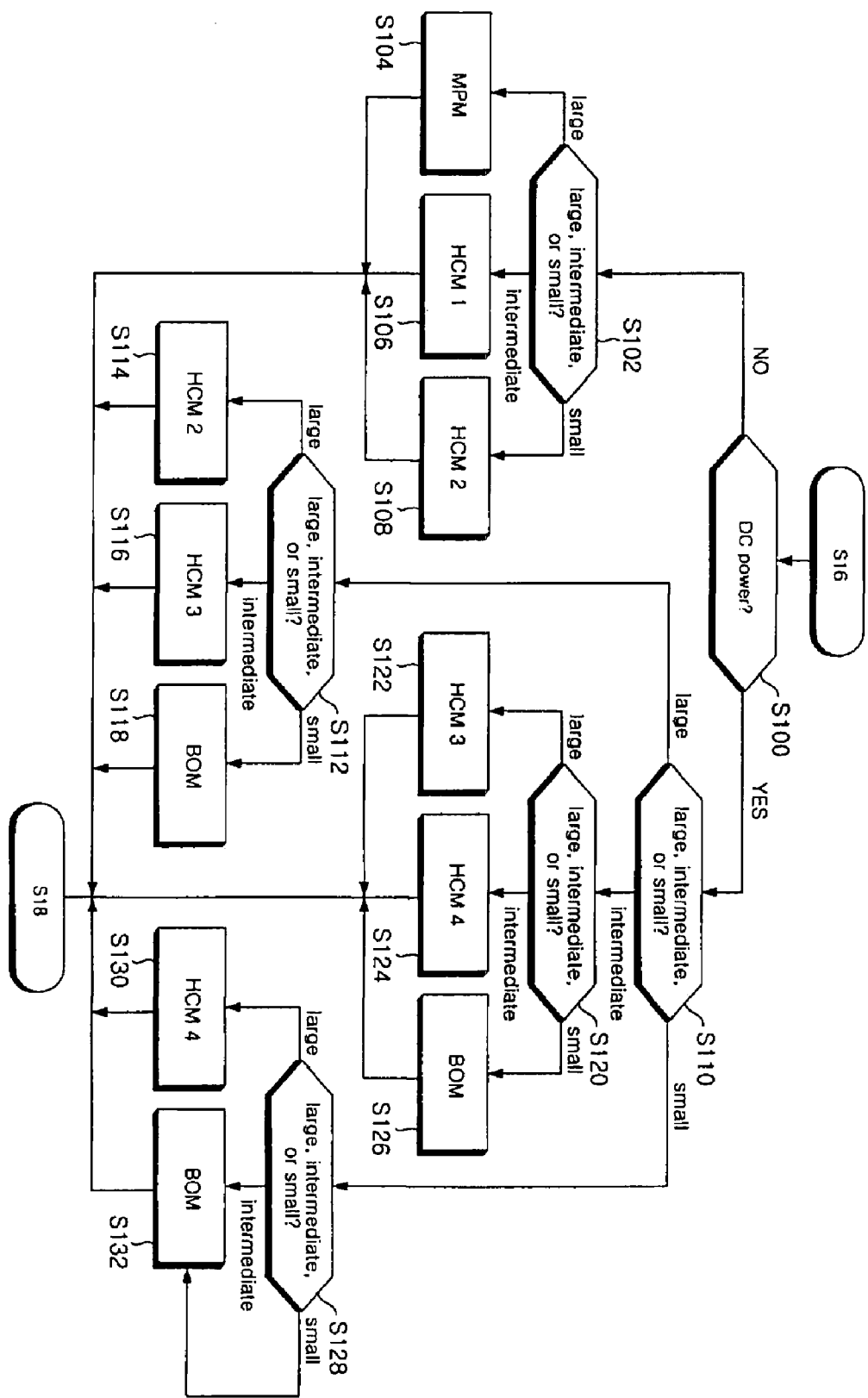
FIG. 5B is a flowchart of a process for searching for the power management mode shown in FIG. 5A.

Referring to FIG. 5B, a process for searching for the power management mode shown in FIG. 5A includes having the power consumption controller 32 first determine if the portable computer 10 operates using an internal power source (e.g., a battery) (S100). If the portable computer 10 does not operate using the internal battery, or when the portable computer 10 is operating using the external power source, the power consumption controller 32 determines if the portable computer 10 operates an application having a relatively large load on the CPU (S102). For example, computer games, photo editing programs, and drafting programs are examples of applications having relatively large application loads.

If an application having a large load is operated, the power consumption controller 32 sets a high speed operation mode (MPM) for the DDR memory 20 (S104), which consumes a relatively large amount of power. If an application having an intermediate load is operated by the CPU, the power consumption controller 32 sets the first hybrid cycling mode (HCM1) for the DDR memory 20, in which the ratio between the high speed interval and the low speed interval is 8:2, which consumes a smaller amount of power than the high speed mode (S106). If an application having a small load is operated, the power consumption controller 32 sets the second hybrid cycling mode (HCM2) for the DDR memory 20, in which the ratio between the high speed interval and the low speed interval is 6:4 which consumes a smaller amount of power than the first hybrid cycling mode (HCM1) as well as the high speed mode (S108). In steps S102 through S108, if the portable computer 10 operates using an external power source, the power consumption controller 32 controls the DDR memory 20 to operate at a clock speed of one of the high speed mode and the first and second hybrid cycling modes (MPM, HCM1, and HCM2) included in the first operation speed mode group. The mode of the first operation speed mode group is selected according to the application load to reduce power consumption even while operating using an external power source.

If the portable computer 10 operates using an internal battery (S100), the power consumption controller 32 determines if the remaining battery level is more than 70%, a value between 40% and 70%, or less than 40% (S110). The power consumption controller 32 determines if the remaining battery level is large, intermediate, or small.

If the remaining battery level is large, i.e., more than 70%, the power consumption controller 32 determines if the amount of the load of the application operated in the portable computer 10 is large, intermediate, or small (S112). If an application having a large load is being operated by the CPU, the power consumption controller 32 sets the second hybrid cycling mode (HCM2) for the DDR memory 20, which consumes less power than the high speed mode (MPM) and the first hybrid cycling mode (HCM1) (S114). If an application having an intermediate load is being operated by the CPU, the power consumption controller 32 sets up the third hybrid cycling mode (HCM2), in which the ratio between the high speed interval and the low speed interval is 5:5 for the DDR memory 20 which consumes less power than the first and second hybrid cycling modes (HCM1 & HCM2) as well as the high speed mode (MPM) (S116). If an application having a small load is being operated by the CPU, the power consumption controller 32 sets up the low speed operation mode (BOM) for the DDR memory 20 to minimize the power consumption (S118). Thus, in steps S112 through S118, if the portable computer 10 operates using an internal power source having a relatively large amount of remaining power, the power consumption controller 32 controls the DDR memory 20 to operate at a clock speed of one of the high speed mode and the second and third hybrid cycling modes (MPM, HCM2, & HCM3) included in the second operation speed mode group and selected according to the quantity of the application load.

If the remaining amount of the internal power is intermediate, i.e. between 40% and 70%, the power consumption controller 32 determines if the quantity of the load of the application operated in the portable computer 10 is large, intermediate, or small (S120). If an application having a large load is being operated by the CPU, the power consumption controller 32 sets up the third hybrid cycling mode (HCM3), in which the ratio between the high speed interval and the low speed interval is 5:5 for the DDR memory 20, which consumes less power than the first and second hybrid cycling mode (HCM1 & HCM2) as well as the high speed mode (MPM) (S112).

If an application having an intermediate load is being operated by the CPU, the power consumption controller 32 sets up the fourth hybrid cycling mode (HCM4), in which the ratio between the high speed interval and the low speed interval is 4:6 for the DDR memory 20, which consumes less power than the first through third hybrid cycling modes (HCM1, HCM2 & HCM3) as well as the high speed mode (MPM) (S130). If an application having a small load is being operated by the CPU, the power consumption controller 32 sets up the low speed operation mode (BOM) for the DDR memory 20 to minimize the power consumption (S126).

Thus, in steps S120 through S126, if the portable computer 10 operates using an internal power source having an intermediate amount of remaining power, the power consumption controller 32 controls the DDR memory 20 to operate at a clock speed of one of the low speed mode and the third and fourth hybrid cycling modes (BOM, HCM3, & HCM4) included in the third operation speed mode group and selected according to the quantity of the application load.

If the remaining amount of the internal power is small, i.e. less than 40%, the power consumption controller 32 determines if the quantity of the load of the application operated in the portable computer 10 is large, intermediate, or small (S128). If an application having a large load is being operated, the power consumption controller 32 sets up the fourth hybrid cycling mode (HCM4) for the DDR memory 20, which consumes less power than the first through third hybrid cycling mode (HCM1, HCM2, & HCM3) as well as the high speed mode (MPM) (S130). If an application having an intermediate load or a small load is being operated, the power consumption controller 32 sets up the low speed operation mode (BOM) for the DDR memory 20, thereby minimizing the power consumption (S132).

Thus, in steps S128 through S132, if the portable computer 10 operates using an internal power source having a small amount of remaining power, the power consumption controller 32 controls the DDR memory 20 to operate at a clock speed of one of the low speed mode and the fourth hybrid cycling mode (BOM & HCM4) included in the fourth operation speed mode group and which is selected according to the quantity of the application load.

After performing steps S104 through S108, steps S114 through S118, steps S122 through S126, or steps S130 and S132, the power consumption controller 32 performs step S18 in FIG. 5B.

As described above, in the system and method for managing power consumption of a graphic control apparatus, if an internal power source is used, the upper limit for the operation speed of the graphic memory is lowered according to the amount of remaining internal power, and the graphic memory device operates at a proper speed according to the application load within the upper limit. Therefore, the power consumption of the computing device associated with the graphic control apparatus is reduced and the operating time for an internal power source, such as a battery, can be efficiently utilized. If an external power source is used, the operation speed of the graphic memory decreases in proportion to the application load associated with applications operating within the system to also reduce power consumption.

Various modifications, additions and substitutions are possible. Accordingly, other implementations are within the scope of the following claims.

What is claimed is:

1. A power management system comprising:
    a graphic controller configured to generate a first display information signal and a second display information signal;
    a memory device operatively connected with the graphic controller,
    a parallel terminal unit, wherein the memory device and the parallel terminal unit are configured to collectively support the graphic controller to generate the first display information signal at a first clock speed and at a first power consumption level, and memory device is configured to support the graphic controller without the parallel terminal unit to generate the second display information signal at a second clock speed and at a second power consumption level;
    a hybrid cycling controller configured to alternately connect the parallel terminal unit with the memory device for the first display information signal and to disconnect the parallel terminal unit from the memory device for the second display information signal during a predetermined period; and
    a power consumption controller configured to control the hybrid cycling controller according to a ratio between a connection interval and a disconnection interval of the parallel terminal unit with the memory device, wherein the ratio is set based on a characteristic of a power source operatively connected to the system.

2. The system according to claim 1, wherein the characteristic of the power source includes an amount of available battery power.

3. The system according to claim 1, wherein the characteristic of the power source includes the operative connection to an internal battery or the operative connection to an external power source.

4. The system according to claim 1, wherein the power source is a battery.

5. The system according to claim 1, wherein the power source is an external power source.

6. The system according to claim 1, wherein the power consumption controller is configured to control the hybrid cycling controller based on a first ratio of the connection interval to the disconnection interval with respect to the parallel terminal unit if the power source is a battery.

7. The system according to claim 6, wherein the power consumption controller is configured to control the hybrid cycling controller based on a second ratio of the connection interval to the disconnection interval with respect to the parallel terminal unit if the power source is an external power source.

8. The system according to claim 7, wherein the first ratio is smaller than the second ratio, and the connection interval to the parallel terminal unit is smaller when the power source is the battery then if the power source is supplied from the external power source.

9. The system according to claim 1, wherein the first display information signal and the second display information signal are based on the operation of at least one application program.

10. The system according to claim 1, wherein the power consumption controller is configured to control the hybrid cycling controller according to an operation mode set by a user, wherein the operation mode controls the connection interval to the parallel terminal unit.

11. The system according to claim 1, wherein the power consumption controller is configured to control the hybrid cycling controller according to an operation mode automatically set by the power consumption controller, wherein the operation mode controls the connection interval to the parallel terminal unit.

12. A method for managing consumption of system power, the method comprising:
 determining if system power is supplied from an internal power source or an external power source;
 detecting an amount of available power of the internal power source if the system power is supplied from the internal power source; and
 alternately connecting and disconnecting a parallel terminal unit with a memory for graphic control based on a ratio between a connection interval and a disconnection interval of the parallel terminal unit with the memory, wherein the ratio defines the connection interval with the memory and the disconnection interval for a given time interval.

13. The method according to claim 12, wherein the ratio is smaller if the power supply is from the internal power source than if the power supply is from the external power source.

14. The method according to claim 12, wherein the ratio decreases in proportion to an amount of available power supply from the internal power source.

15. The method according to claim 12, further comprising:
 determining if the ratio has been set by a user; and
 alternately connecting and disconnecting the parallel terminal unit and the memory for graphic control based on the ratio set by the user.

16. A method for managing system power consumption, the method comprising:
 determining if system power is supplied from an internal power source or an external power source;
 detecting an amount of available power of the internal power source if the power supply is supplied from the internal power source; and
 alternately connecting and disconnecting a parallel terminal unit with a memory for graphic control based on a ratio between a connection interval and a disconnection interval of the parallel terminal unit with the memory, wherein the ratio defines the connection interval with the memory and the disconnection interval for a given time interval;
 detecting an amount of load from any operating application program; and
 controlling the connecting and disconnecting of the parallel terminal unit with the memory for graphic control based on the amount of load and the ratio between the connection interval and the disconnection interval.

17. The method according to claim 16, further comprising:
 determining if a user has set the ratio between the connection interval and the disconnection interval; and
 alternately connecting and disconnecting the parallel terminal unit with the memory for graphic control based only on the ratio set by the user.

18. A system for managing power consumption, comprising:
 a central processing unit configured to operate one or more applications;
 a memory operatively connected with the central processing unit, the memory being configured to communicate data at a high clock speed and a low clock speed;
 a parallel terminal unit operatively connected with the memory;
 a switch configured to connect and disconnect the parallel terminal unit to and from the memory;
 a hybrid cycling controller configured to periodically control the switch to connect or disconnect the parallel terminal unit to and from the memory;
 an internal power source for supplying system power;
 an external power adaptor for supplying system power; and
 a power consumption controller configured to control the hybrid cycling controller according to a ratio between a connection interval and a disconnection interval of the parallel terminal unit with the memory, wherein the ratio is set based on a whether the power source operatively connected to the system is the external AC adaptor or the internal power source.

19. The system according to claim 18, wherein the ratio is based on an amount of available battery power.

20. The system according to claim 18, wherein the internal power source is a battery.

21. The system according to claim 18, wherein the power consumption controller is configured to control the hybrid cycling controller based on a first ratio of the connection interval to the disconnection interval with respect to the parallel terminal unit if the power source is a battery.

22. The system according to claim 21, wherein the power consumption controller is configured to control the hybrid cycling controller based on a second ratio of the connection interval to the disconnection interval with respect to the parallel terminal unit if the power source is an external power source.

23. The system according to claim 22, wherein the first ratio is smaller than the second ratio, and the connection interval to the parallel terminal unit is smaller when the power source is the battery then if the power source is supplied from the external power source.

* * * * *